United States Patent [19]

Wilcox

[11] Patent Number: 4,801,202

[45] Date of Patent: Jan. 31, 1989

[54] METHOD AND APPARATUS FOR RADIOMETER STAR SENSING

[75] Inventor: Jack E. Wilcox, Dekalb, Ind.

[73] Assignee: ITT Aerospace Optical, Fort Wayne, Ind.

[21] Appl. No.: 811,963

[22] Filed: Dec. 20, 1985

[51] Int. Cl.$^4$ .................. G01B 11/26; G01C 1/00; G01J 1/20

[52] U.S. Cl. .................. 356/152; 356/141; 250/203 R

[58] Field of Search ............ 356/152, 141, 253, 255; 250/203 R

[56] References Cited

U.S. PATENT DOCUMENTS

| | | | |
|---|---|---|---|
| 3,448,272 | 6/1969 | Slater | 356/152 |
| 3,713,740 | 1/1973 | Lillestrand et al. | 356/141 |
| 3,744,913 | 7/1973 | Farthing et al. | 250/203 R |
| 3,827,807 | 8/1974 | Fletcher et al. | 356/141 |
| 3,912,397 | 10/1975 | Zoltan | 356/152 |
| 4,082,462 | 4/1978 | Owen | 356/152 |
| 4,159,419 | 6/1979 | Wittke | 356/152 |
| 4,181,851 | 1/1980 | Allen et al. | 356/141 |
| 4,413,906 | 11/1983 | Feldman et al. | 356/141 |
| 4,618,259 | 10/1986 | Czichy | 356/152 |

Primary Examiner—Stephen C. Buczinski
Assistant Examiner—Melissa L. Koltak
Attorney, Agent, or Firm—Robert A. Walsh; Thomas N. Twomey; Mary C. Werner

[57] ABSTRACT

A method and apparatus for determining the orientation of the optical axis of radiometer instruments mounted on a satellite involves a star sensing technique. The technique makes use of a servo system to orient the scan mirror of the radiometer into the path of a sufficiently bright star such that motion of the satellite will cause the star's light to impinge on the scan mirror and then the visible light detectors of the radiometer. The light impinging on the detectors is converted to an electronic signal whereby, knowing the position of the star relative to appropriate earth coordinates and the time of transition of the star image through the detector array, the orientation of the optical axis of the instrument relative to earth coordinates can be accurately determined.

11 Claims, 5 Drawing Sheets

METHOD AND APPARATUS FOR RADIOMETER STAR SENSING

The invention described herein was made in the performance of work under NASA Contract No. NAS 5-29500 and is subject to the provisions of Section 305 of the National Aeronautics and Space Act of 1958 (72 Stat. 435; 42 U.S.C. 2457).

The invention relates to a system for orienting earth scanning radiometer instruments using the instruments themselves to take star sitings to determine the exact optical axis of the instruments.

The use of radiometer instruments mounted on the satellites for earth scanning is well known. Examples of these radiometers are the Imager and Sounder instruments which have been used on satellites which are geostationary, i.e., they remain in a substantially stationary position over a particular earth location.

The imager of the present invention comprises a telescope assembly, visual and infrared (IR) detector sets an electronics module, and various housing components for thermal stability. A two axis gimballed area scan system permits the Imager's multielement spectral channel to simultaneously sweep a swath of the earth's surface and then sweep adjacent swaths in a bidirectional raster scan until the desired earth area is scanned. Beam splitters separate the scan channels to the various IR detector sets.

The sounder of the present invention is similar to the Imager in comprising a telescope assembly, an electronics module, and adaptations for thermal control in its housing. However, it also contains a rotating filter wheel which enables it to sample a plurality of spectral channels by sequentially placing the filters on the rotation wheel in the optical path. Unlike the imager, the sounder does not perform a continuous scan but rather remains focused on a single area until the wheel has completed a full rotation and all spectral channels have been sampled whereupon the telescope is refocused on a different earth location and the process is repeated.

The exact orientation of the imager and sounder must be ascertained in order that the exact earth coordinates of the area being scanned can be determined and, if desired, a refocusing of the instruments can take place. It has previously been suggested that the orientation of these instruments may be determined by using a separate instrument to take a siting on a star which is chosen for its suitability with respect to brightness and location. The use of a separate star sensing instrument has the technical drawback that, if there has been any warping of the satellite structure due to temperature differences between the surfaces, the bore sight of the star sensing instrument will have a different relative alignment to the bore sights of the imager and sounder than what would be assumed. Such a misalignment would result in misaiming of the imager and, sounder. Also, a separate star sensing instrument adds to the cost of the satellite.

Another star sensing technique which has been proposed involves the use of the satellite imager or sounder itself in the scanning mode. This method would involve taking sightings on relatively bright stars during the scan, and using the information to determine the orientation of the imager and sounder. However, the use of the imager or sounder in the scanning mode has two drawbacks. First, since scanning requires a relatively wide sensing bandwidth to detect light of various wavelengths, the instrument senses considerable noise, thus resulting in a low signal to noise ratio. Thus, as a practical matter only bright stars can be detected. However, there are not enough stars of sufficient magnitude to provide adequate navigation because of this problem. Second, at around midnight the sun will be near the star beams being sensed which will cause light scattering into the field of view. Since the amount of scattering is a function of the angle between the instrument boresight and the sun, the scattering will change as the instrument scans. This changing background will further reduce the instrument's ability to detect faint stars.

SUMMARY OF THE INVENTION

An object of the invention is to provide an inexpensive method and apparatus for determining the exact position of radiometer instruments mounted on an orbiting satellite relative to a star, and then using this information to aim these instruments precisely at desired areas of the earth's surface.

This and other objects of the invention are achieved by a provision of means for orienting a radiometer mounted on a satellite such that the radiometer is aimed toward the prospective path of the star, means for converting light received from the star into an electrical signal, and means for transmitting the optical signal to a ground station. More- specifically, the means for aiming the radiometer in the satellite's path comprises a digital servo control system for establishing the desired angular location of the radiometer's scan mirror. The means for converting the light from a star to an optical signal comprises optics for separating the light into appropriate spectral channels and imaging it onto the respective detectors for each channel. Each detector converts the received radiant energy into an electrical signal that is amplified, filtered, digitized, and put into a data stream. The means for transmitting the electrical signal to ground comprises line driver circuitry for interfacing the data streams with the satellite transmitter. The transmitter sends the digital information to the ground station.

BRIEF DESCRIPTION OF THE DRAWINGS

The above-mentioned and other features and objects of this invention will become more apparent by reference to the following description taken in conjunction with the accompanying drawings, in which.

DESCRIPTION OF THE PREFERRED EMBODIMENTS

Figure 1:
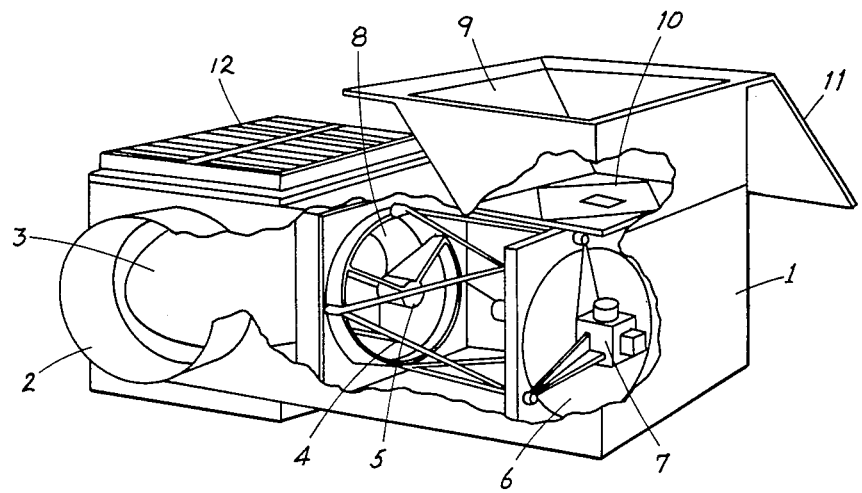
FIG. 1 shows a perspective view of the imager of the invention.

As shown in FIG. 1, imager 1 comprises an optical port 2 in which is mounted scanner mirror 3. The scan mirror 3 is connected to a telescope assembly 4 which comprises a primary mirror 6 and telescope secondary mirror 5. The telescope secondary mirror 5 is in turn connected to a telescope primary mirror 6 which focuses the light obtained from scanner assembly mirror 3 onto a set of optical elements 7. The optical elements 7 comprise beam splitters for separating the incoming energy into the spectral bands of interest. Energy in the infrared band is deflected towards detectors within radiant cooler 9, while the visible energy passes through the beam splitters and is focused on visible detector elements. The detectors serve to convert light energy into electrical signals as shown in detail in FIG. 3.

Other components of the imager include the aforementioned radiant cooler 9, a radiant cooler patch 10 which is shielded from sunlight, and a cooler cover 11. A set of thermal control louvers 12 aids in maintaining a desired temperature for the assembly.

Figure 2:
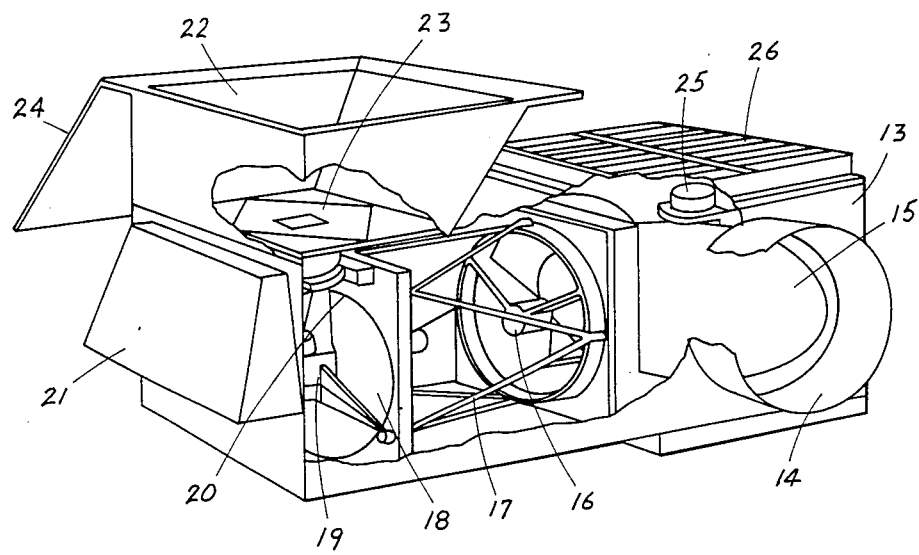
FIG. 2 shows a perspective view of the sounder of the invention.

The sounder of FIG. 2 is similar to the imager of FIG. 1. Analogous elements include the optical port 14, scan mirror 15, secondary telescope mirror 16, telescope assembly 17, primary telescope mirror 18, and optics elements 19. Other similar elements include the radiant cooler 22, the cooler patch 23, the cooler cover 24, and the thermal control louvers 26. All of the analogous elements function in the same manner as their counterparts in the imager.

Elements not found in the imager but located in the sounder include filter wheel assembly 20, and filter wheel radiant cooler 21. The filter wheel 20 is a disk shaped element having a plurality of filters mounted therein such that rotation of a specific part of the wheel into the path of the incoming radiant energy places a narrow band filter into the path of the radiant energy and thus limits the radiant energy passing through it and reaching the visible light and infrared detectors. The cooler 21 serves to cool the filter assembly 20 to a constant low temperature which has the benefits of reducing emitted energy which might cause random noise, and provides a very low background radiant energy input to the detector to help improve detector sensitivity.

Figure 3:
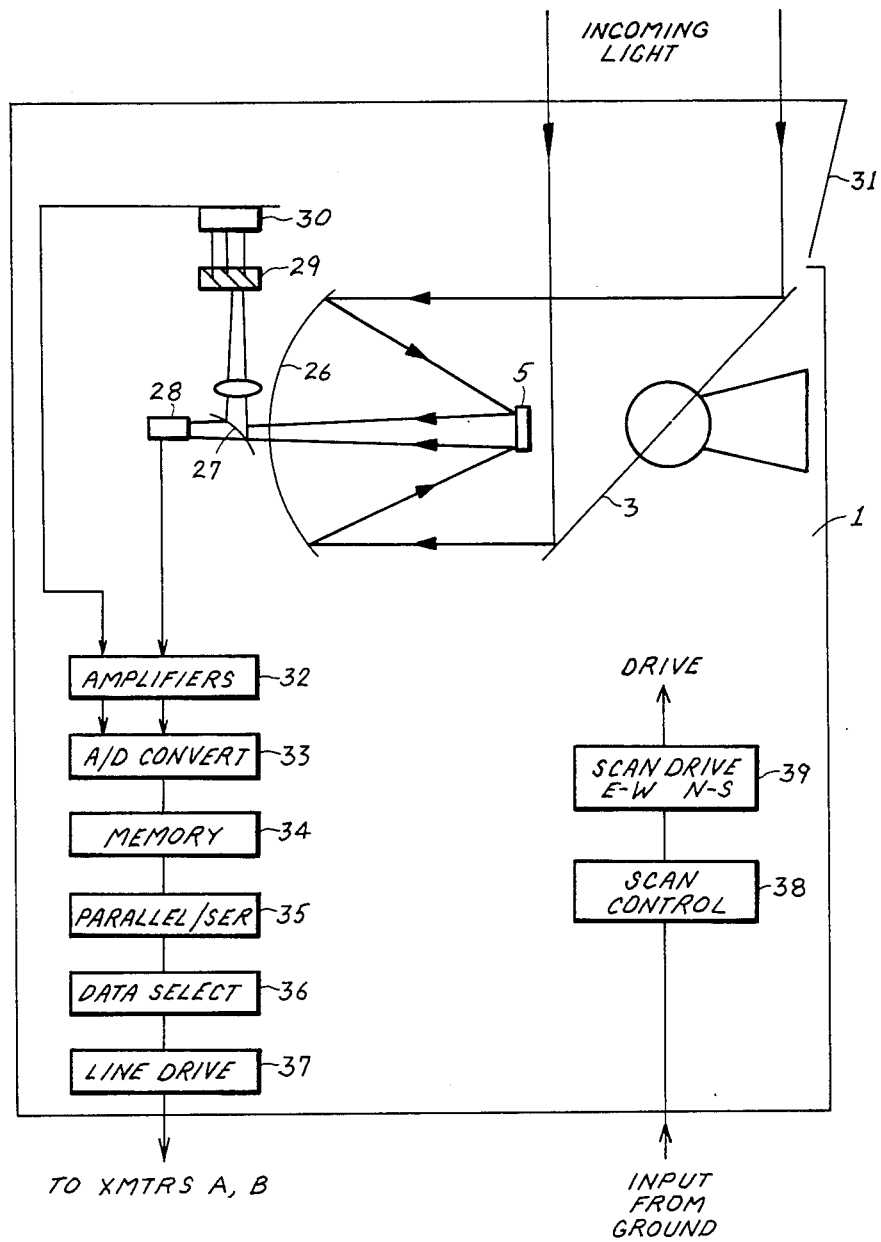
FIG. 3 shows a schematic view of the electronics associated with the imager of the invention.

The electronics of the imager are shown in FIG. 3 wherein incoming light impinges on scan assembly mirror 3 and is reflected from telescope mirrors 5 and 6 to impinge upon the beam splitter 27. The beam splitter 27 separates the radiant energy into the spectral bands of interest such that the visible energy passes through them and is focused on visible detector elements 28 while the infrared energy is deflected towards beam splitters 29 which divide it into a plurality of channels within the infrared spectrum. The individual channels then impinge upon infrared detectors 30. The various light detectors operate to convert the incoming beams to electrical signals which are conveyed to amplifiers 32. The analog signals are then fed to analog to digital converter 33 which converts the analog signals into digital form. The analog to digital converter 33 takes each of the amplified voltage signals from the individual infrared and visible detectors and converts it into a digital word which is 10 bits long. The digital words are then shifted in sequence into a data bit stream and then stored in memory 34. From the memory, blocks of data are converted into serial form by module 35 and then shifted serially to the data selector 36 where final formatting occurs. The data selector 36 is a relatively standard multiplexer collecting the sensor data in accordance with a timing sequence. From there, the serial stream is passed through a line driver 37 where the pulse amplitude and impedance levels are set for the interface to the transmitters A, B which are mounted elsewhere on the satellite and transmit the data signals to the earth.

Redundancy is maintained throughout the electronic system with two identical data streams being fed respectively to transmitters A and B.

Control of the scanning mirror 3 is effected by scan control module 38 and scan drive module 39 which receive an input from the earth and convert it into a drive signal for the scanning mirror. Details of the circuitry for effecting scanning mirror orientation are found in FIG. 5.

Figure 4:
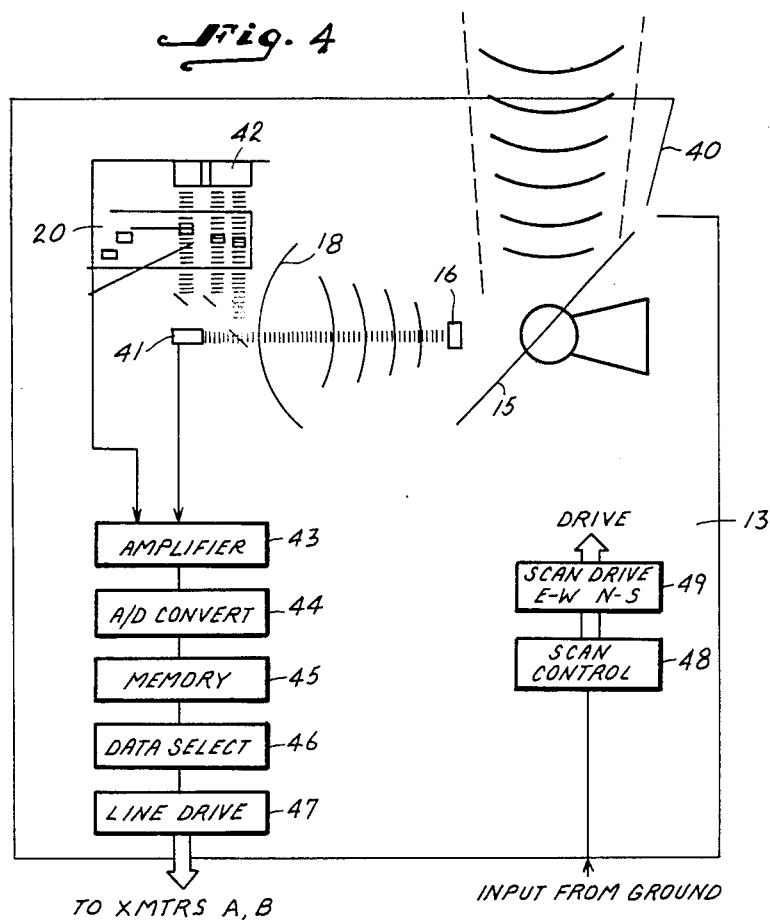
FIG. 4 shows a schematic view of the electronics associated with the sounder of the invention.

The electronics for the Sounder radiometer shown in FIG. 4 are quite similar to those for the Imager shown in FIG. 3. Analogous elements include the scanning mirror 15, primary mirror 18, telescope secondary mirror 16, visible detectors 41, and infra-red detectors 42. Likewise, the electronics modules including amplifiers 43, analog to digital converter 44, memory 45, data selector 46, line drive module 47, scan control module 48, and scan drive module 49 function similiarly to the equivalent elements in the Imager circuitry. However, the Sounder circuitry differs from that of the Imager in that it contains filter wheel assembly 20. As stated previously, the filter wheel acts as the spectral defining element in the system. Each filter mounted on the wheel has a very narrow spectral passband which restricts the radiant energy impinging upon the various detectors.

Figure 5:
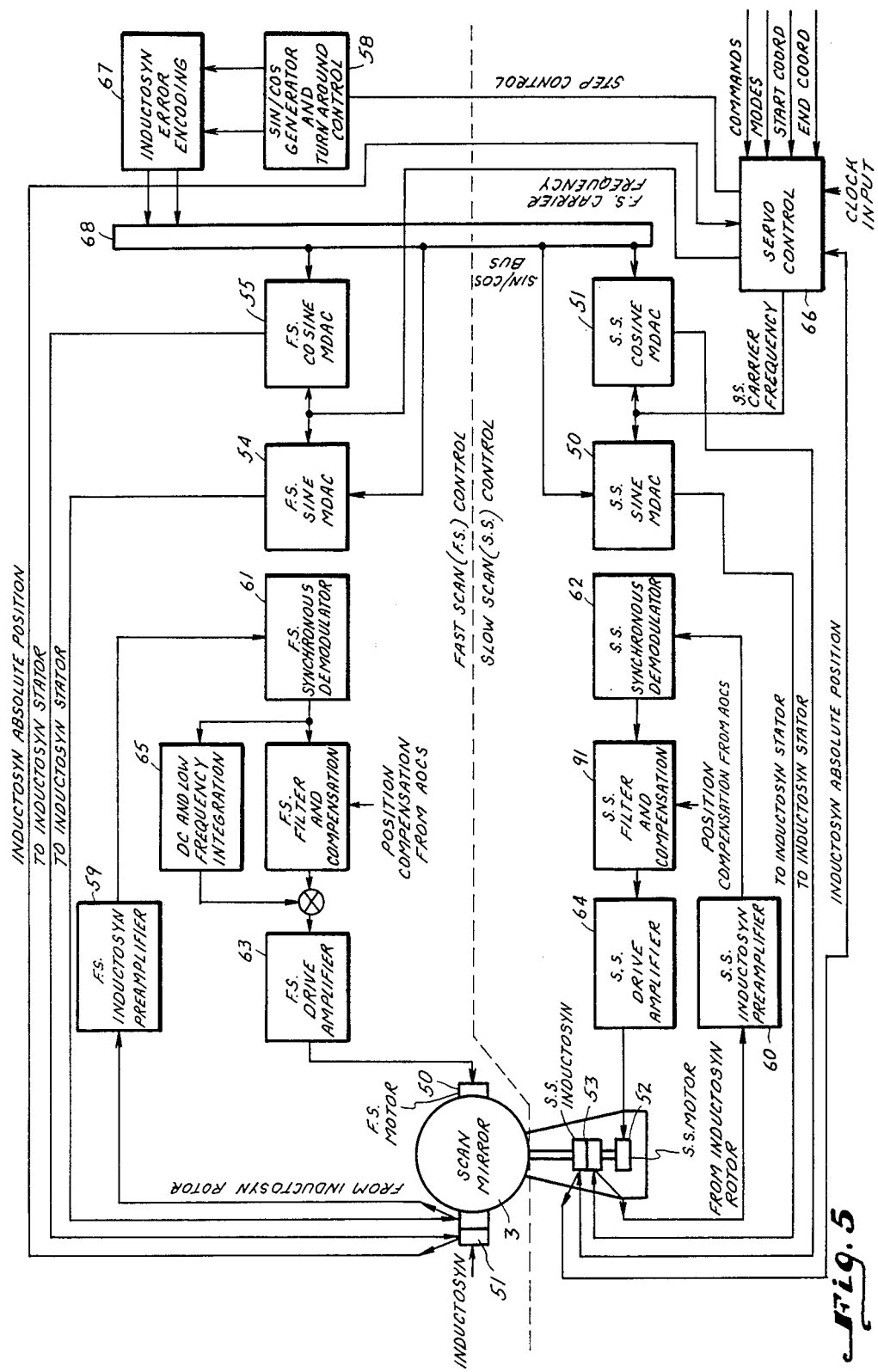
FIG. 5 is a schematic of the servo mechanism for the scan mirror of the imager.
Figure 6:
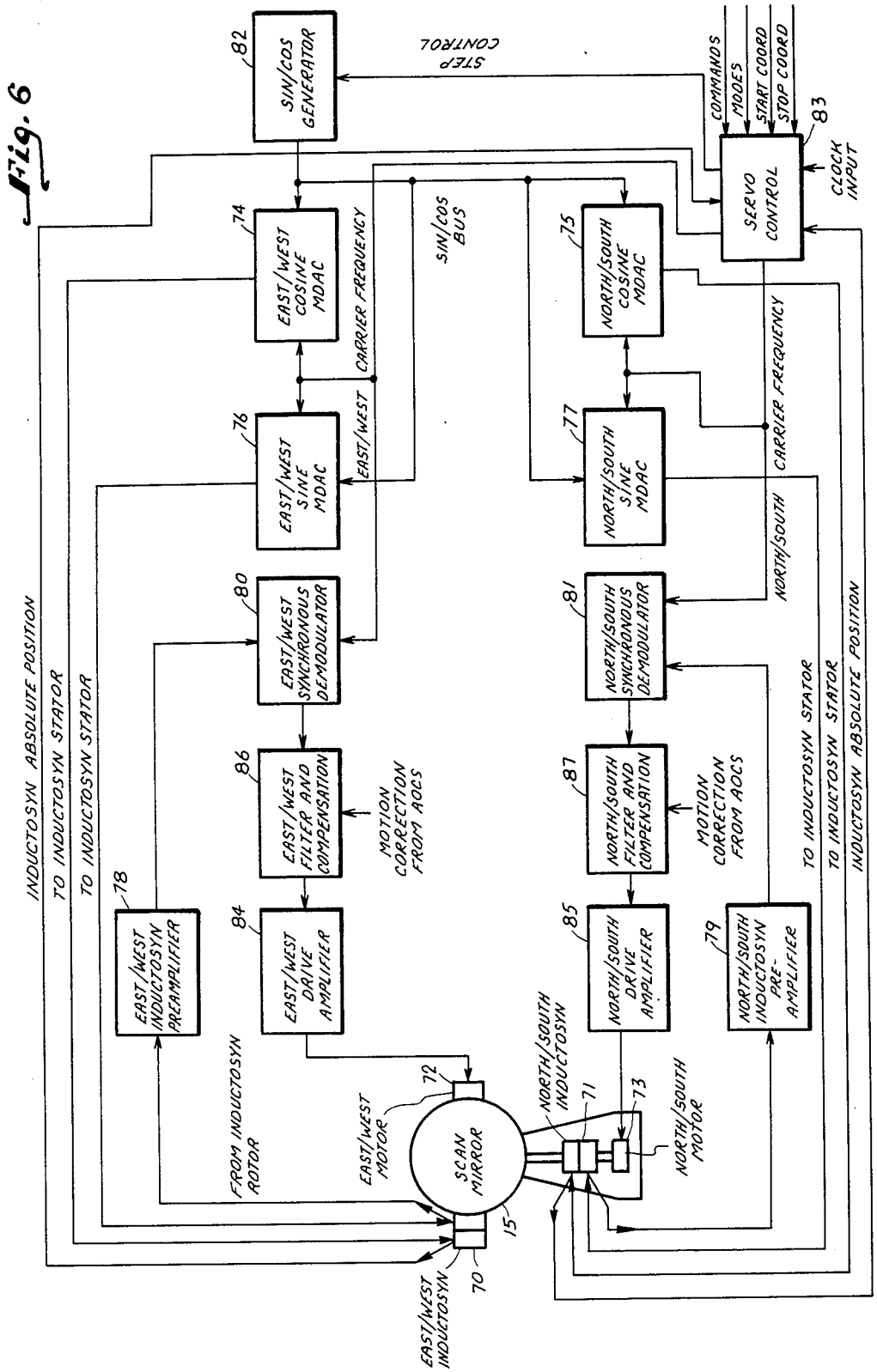
FIG. 6 is a schematic of the servo mechanism for the scan mirror of the sounder.

As shown in FIG. 5, scan control is generated by establishing a desired angular location for the mirror 3. The desired angle is fed from a servo control module 66 through sine/cosine generator 58, inductosyn error encoding module 67, bus 68 etc. to an angular position sensor (51,53) called an Inductosyn whose output is a displacement error signal. The error signal is fed to a direct drive torque motor (50, 52) which moves the mirror 3 and sensors 51, 53 to the null location.

For latitudinal deflection the direct-drive torque motor 50 is mounted to one side of the mirror and the position-sensing device 51 (Inductosyn magnetic position encoder) is mounted to the opposite side. All rotating parts are on a single shaft, with a common set of bearings (not shown). Coupling of the drive, motion and sensing is therefore very tight and precise, using components that have intrinsically high resolution and high reliability. Longitudinal motion is provided by rotation of a gimbal (not shown) holding the above components about the optical axis of the telescope. The rotating shaft has the rotary parts of another torque motor 52 and Inductosyn 53 mounted to it, again providing the tight control necessary. and error-sensing components of the two drive systems are identical. Control components are optimized for the frequency and control characteristics of each, and logic is developed for the precise control of position in response to servo control module 66.

The Inductosyn rotary encoder 57 consists of parallel plates having deposited metal patterns forming a total of 256 poles. Each pole pair of the rotor is matched to one on the stator such that when the stator winding is energized by an ac signal the rotor winding generates a small signal corresponding to the level of coupling. The pattern is such that the error signal is one sinusoidal cycle over the distance of one pole pair (but acts on the cumulative effect of all pairs). Each cycle (360 /128) is 2.8125°. The input signal is a carrier whose amplitude is a combination of sine and cosine signals that cause a null at specific locations within the 2.8125° segment. In addition to the 256 pole pattern a second pattern is included on the same disk. This pattern has a one pole differential between the rotor and stator such that one cycle of error signal is generated for the full 360° rotation. Using this output the absolute location can be guaranteed while the fine resolution pattern provides control down to the microradian level.

Two digitally-generated carrier signals from servo control module 66 converted to two analog carrier signals via multiplying digital to analog converters 54, 55, 50 51 excite the stator windings of each Inductosyn. The ratio of the two analog signals represents the unique position in repeating 2.8125° sectors. The ac error signal from the secondary (rotor) winding is amplified and fed to a phase-sensitive detector which converts it to a dc level of the proper polarity. The dc signal is amplified, with compensation for stability and damping, and fed to the dc torque motor which drives the servo to a null position.

The digital generation of the Inductosyn drive signals uses a look-up Read-Only Memory (ROM) programmed as a sin/cos generator 58. The sine of each of 0.058° part of the 360 electrical degrees is encoded into a 16-bit word, and permanently stored in the ROM. The electrical angle between 0° and 360° is explicitly defined by the code into the sin/cos select. A second ROM provides the cosine of the angle. The sin/cos functions are generated for both the fast scan (FS) and slow scan (SS) using the same ROM.

Scan control is initiated by the input proportional commands that set end locations of an image frame. A location is identified by a value from the coarse and fine encoder look-up tables. The large distance between a present location and the start location is recognized, causing incremental steps (8 ur) at a high rate (21817 per second) to reach that location. This occurs simultaneously for each axis. From the scan start position the same pulse rate and increments are used to generate the linear scan. Inertia of the mirror smooths the small incremental steps to much less than the error budget.

At the scan end location (where the commanded position is recognized) the control system enters a preset position control pattern that is optimized for efficiency and time. During the 0.2 seconds a 32-increment cosine function of position control slows and reverses the mirror, such that it is precisely in location and moving at the exact rate to begin a linear scan in the opposite direction. During this interval the slow scan control moves the gimbal assembly exactly 224 ur (28 increasement of 8 ur) in the south direction. Linear scanning and stepping continue until the southern limit is reached.

Retrace to the start position or to the next frame start location is at the same constant slew rate in each axis. Since this slew rate is precise, the time and direction are provided to a spacecraft Inertial Control System (AOCS) where the inertias are translated to effective spacecraft motion. The inverse of this motion is converted to a scan error drive signal (at 10 volts per 210 ur) which comes back to both drive systems and for each instrument. The AOCS continuously integrates the inputs from both instruments and provides the small incremental corrections that maintain the boresight of the instruments in spite of spacecraft motion. This correction is easily implemented, entering the drive chain at an error signal location as an open loop input. (The Imager corrects itself to the new location but there is no loop through the spacecraft for such small correction).

Scans to space for space clamp or star sensing use the same position control and slew functions as for scan and retrace. Either command inputs (for star sensing) or internal subprograms (for space clamp and IR calibration) take place at the proper time after a frame.

The scan control system shown in FIG. 5 is for both the fast scan and slow scan. The FS and SS sine and cosine 16-bit codes are latched into their respective multiplying digital-to-analog converters (MDAC). These codes modulate the amplitude of the FS and SS carriers. The carriers are in the range of 10 kHz but are sufficiently different to avoid cross coupling. This error signal from the Inductosyn is preamplified by modules 59 or 60, synchronously-demodulated by modules 61 or 62 bandpass filtered by modules 91 or 92, amplified by modules 63 or 64 and fed back to a motor which rotates the Inductosyn rotor and mirror to reduce the error signal to zero. This points the scan mirror to the precise angle specified by the input code. The Fast Scan path also contains DC and low frequency integration 65 to remove errors because of noise, drag, bearing imperfections, misalignment, and imperfections in the Inductosyn.

The key elements of the Sounder scan system are the Inductosyns 70, 71 which, by respectively driving motors 72, 73 accurately determine the mechanical angular position of the scan mirror relative to an input reference electrical angle. The Inductosyn has 256 poles; hence a 360° change in the angle of the reference electrical signal corresponds to 2.8125° of mechanical rotations. The output of the Inductosyn is zero when the mechanical angle and electrical angle are precisely aligned, therefore, this output can be used as an error signal. This error signal is amplified, phase detected, filtered and applied to a torque motor. The torque motor rotates the scan mirror assembly reducing the error signal to zero.

The electrical reference signal into the Inductosyns 70, 71 consists of two identical carriers: one amplitude modulated with the cosine of $\theta$ from digital to analog converters 74,75 and the other amplitude modulated with the sine of $\theta$ from digital to analog converters 76,77 where $\theta$ is the reference electrical angle. The sines and cosines are obtained from ROM look-up tables in sine/cosine generator 82 which is driven by servo control module 83. One complete cycle (360° electrical) is stored in 2805 increments. Each increment corresponds to 17.49996 ur of mechanical rotation. The sine and cosine are each specified by a 16-bit word. This yields a mechanical angular accuracy of 0.5 ur or less.

An optical step angle in the fast scan direction between soundings is 280 ur. Since scanning is accomplished by tilting the mirror, only 140 ur of mirror rotation is required. Thus, eight angular increments are required to step from one sounding position to the next. This step differs from 140 ur by 0.00003 ur. Registration error due to step error in a full earth E-W scan is less than 0.1 ur.

The optical step angle in the slow scan direction (N-S) between scan lines to increment the four detectors is 1120 ur. Since scanning is accomplished by rotating the mirror about the optical axis of the telescope, the optical angle and the mechanical angle are the same. To achieve this step angle requires stepping through 64 angular increments in the ROM. This yields a step angle that differs from 1120 ur by 0.003 ur. Thus, the registration error due to step error in a full earth N-S scan is less than 1 ur.

The step angle and angular inertia in the N-S scan are respectively 4× and 2.5× larger than in the E-W scan. Therefore, additional time (one 0.1 second sounding period) is used just for the extra deflection. This sounding period is used for step and settle only, and its data is invalid. The next sounding period is valid and processed normally.

The preamplifiers 78 79 synchronous demodulators filters 86,87, and drive amplifiers 84,85 in the Sounder are similar to the Imager counterparts. The Inductosyn fixed pattern correction signal and the line-to-line integrator processing and error correction used in the Imager are not required for sounding.

Absolute angular reference is developed from a low resolution winding included in the Inductosyn 70,71. The resolution of this encoder is adequate to resolve the ambiguity as to which set of poles in the high resolution portion of the Inductosyn are aligned with the mirror. The output of the winding is included in the output data block to verify the location of the scan in the total field.

Each bilevel operational command contains a priority bit which indicates if this command should interrupt the present sounding operation and implement the received command. If the priority command is active, the scan control stores the address of the last scan position in memory and the scan mirror goes to the start position of the priority command and starts the frame sounding. After completion of the sounding frame with the required number of repeats, the scan mirror slews to the stored position and completes the interrupted command.

The priority command will be used to implement star sensing. The start address will be slightly to the east of the expected star position. The stop address will be the same as the start address. This will cause the scan mirror to remain in the same position for the number of frame repeats (up to 64). Each sounding will constitute a frame. The ground station will be able to determine when the star passes onto and off the detector as the star sweeps through the scene at 73 ur/sec. Position of the star can be determined to within ±14 ur or better in both latitude and longitude.

Scanning to space is determined by an internal timing reference or ground command. At approximately 3 minute intervals the scan control stores the address of the last scan position into memory and slews east or west to space (the direction is determined by ground command). After the space look (40 samples) and electronic calibration (20 samples) the scan slews back to the stored position. At approximately 30 minute intervals, the scan control stores the address of the last scan position and then slews to space for a space look and then slews to the IR blackbody for IR calibration (40 samples). After IR calibration, the scan slews back to the stored address and resumes its previous operation. The slew rate for all of these operations is 10°/second. The maximum time for a space look is 10 seconds and for an IR calibration is 48 seconds, respectively.

Slewing of the Sounder or Imager scan mirror affects the attitude of the spacecraft. The Sounder generates output signals which inform the spacecraft computer when the scan mirror is slewing and in what direction. The spacecraft computer determines the change in spacecraft attitude and generates analog signals proportional to the change in the E-W and N-S direction. These signals are used to offset the scan mirror to cancel the change in attitude. Maximum correction in each axis is ±210 urad.

It should be noted that the servo system hereto described is very similar to that used on the INSAT satellite, the first of which was launched in June 1982.

The star scanning method of the present invention involves the use of radiometers such as the Imager and Sounder described above. Such instruments have a two axis scan mirror with a field of view that extends beyond the limb of the earth by at least one or two degrees. The visible detector array of the radiometer is a line scan array of high resolution detectors with the long axis of the array oriented perpendicularly to the orbital plane of the spacecraft upon which the radiometer is mounted.

The method of this invention involves orienting the optical axis of the radiometer such that it is positioned slightly ahead of the expected position of the star to be sensed by the two axis scan mirror. The motion of the scan mirror is thus stopped, thus allowing the motion of the space craft to cause the star image to drift through the field of view of the detector array. Then, knowing the position of the star relative to appropriate earth coordinates and the time of transition of the star image through the detector array, the orientation of the optical axis of the instrument relative to earth coordinates can be accurately determined. The angular accuracy will be equal to or better than one half the field of view of individual detectors in the array.

Figure 7:
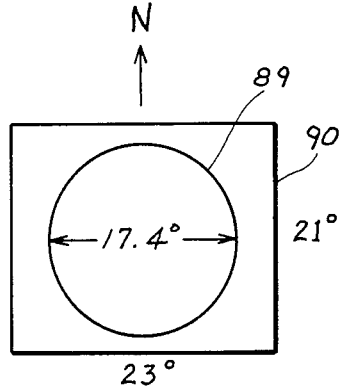
FIG. 7 is a schematic showing the scanner field of view of the earth and its surroundings.

As an example, radiometers can be mounted on a three axis stabilized spacecraft in a twenty four hour equatorial orbit. Such a spacecraft will be geostationary over a particular point on the earth's equator. FIG. 7 shows the scanner of such a radiometer having a fielded view of 21° to 23° centered on the earth. The angular obscuration of the sky by the earth will be 17.4 degrees. Stars will appear to move from west to east in this view at rate of 73 microradians per second. A star will be in view a minimum of 11 minutes on each side of the earth and will take 91 minutes to traverse the entire 23° east to west field of view.

Figure 8:
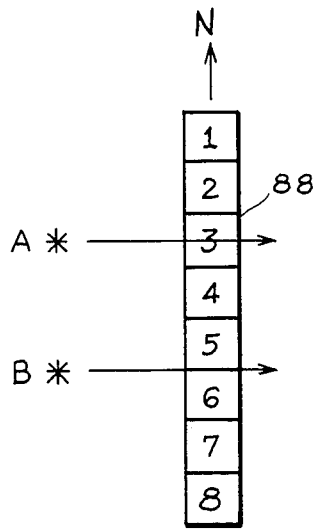
FIG. 8 is a schematic illustrating a star traversing a radiometer detector array.

At a convenient time when a star is within the unobscured field of view of the scan mirror the scan mirror will be pointed so that the image of the detector array 88 will be slightly to the east of the star A as shown in FIG. 8. The star will drift through the detector array 88 due to the orbital motion of the satellite as shown in FIG. 8. The position of the star can be in position A where is centered on a detector or in position B where it is centered between two adjacent detectors or any place in between. The optical system will be designed so that the star image will be finite and smaller than each detector in the array. If the star image is near position A, all of the radiant energy will impinge on detector number 3 in the array 88 and the best estimate of the North-South position of the star will be the center of the detector. The error in this estimate will be less than ±0.5 of the detector field of view. If the star is near position B the North-South position of the star can be determined very accurately by knowing the star image size and the ratio of the signals in the adjacent detectors 5 and 6 in array 88. The East-West position of the star will be derived by determining the time when a 50 percent amplitude point occurs when the star image comes onto the detectors from the west and when it leaves to the east. Positional accuracy East-West will be primarily a function of signal to noise ratio and should be significantly better than ±0.5% of the detector field of view.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system for orienting the optical axis of a radiometer instrument mounted on an orbiting spacecraft to enable said instrument to scan a desired area on a remote body such as the earth by taking a siting of a single star whose location is used to accurately determine the optical axis of said instrument, comprising:

optical detection means associated with said instrument and operative to detect radiant energy, said optical detection means including an array of detectors having a long and a short axis, with the long axis of said array positioned perpendicularly to the orbital plane of said spacecraft with each detector in said array operative to provide an output signal upon the impingement of radiant energy on said detector, controllable scanning means positioned with respect to said array and operative to scan said detectors in said array as controlled by a servo signal, servo means coupled to said scanning means and operative to control the scanning position of said scanning means according to a control servo signal, means coupled to said servo means to cause said scanning means to commence a scan of said detector array so that the image of said array is slightly ahead of the expected position of said star and for stopping said scan when said star is radiating upon said array to cause the image of said star to drift through the field of said optical detection means due to the orbital motion of said spacecraft, means for detecting the time of transition of movement by said star image through said array to determine the orientation of the optical axis of said instrument relative to said desired scanned area.

2. The system according to claim 1, wherein said scanning means includes a two-axis scan mirror.

3. The system according to claim 1, wherein said detector array is a line scan array of high resolution detectors.

4. The system according to claim 1, wherein the star image as imaged on said detectors is smaller in area than the area of said detector.

5. The system according to claim 1, wherein said means coupled to said servo means includes a scan control means responsive to signals transmitted from a control station to cause said scanning means to position the image of said star slightly to the east of the expected star position.

6. A method of detecting the orientation of the optical axis of a radiometer instrument mounted on an orbiting spacecraft to enable said instrument to scan a desired area on a remote body such as the earth by taking a siting of a single star whose location is used to accurately determine the optical axis of said instrument, comprising the steps of:

orienting an array of optical detectors associated with said radiometer with the long axis of said array perpendicular to the orbital plane of said spacecraft, pointing a scan mirror so that the image of said detectors is slightly ahead of the expected position of the star to be sensed, stopping said scan mirror after pointing to allow the image of said star to drift through said array due to the orbital motion of said spacecraft, determining the time of transition moved by said image through said array to calculate the orientation of the optical axis of said instrument relative to said desired scanned area.

7. The method according to claim 6, wherein said scan mirror is a two-axis scan mirror.

8. The method according to claim 6, wherein said detector array is a line scan array of high resolution detectors with the long axis of said array oriented perpendicularly to the orbital plane of said spacecraft.

9. The method according to claim 6, wherein the star image as imaged on said detectors is smaller in area than the area of each detector.

10. The method according to claim 6, wherein the step of pointing said scan mirror includes transmitting a control signal to said spacecraft from a ground station indicative of a pointing position for said mirror.

11. The method according to claim 6, wherein the step of determining the transition time includes computing the ratio of detected signals in adjacent detectors in regard to the size of the star image.

* * * * *